Aug. 25, 1931.	R. B. MILLER	1,820,083
HYDRAULIC VARIABLE SPEED POWER TRANSMITTING MECHANISM
Filed Aug. 25, 1930	4 Sheets-Sheet 1
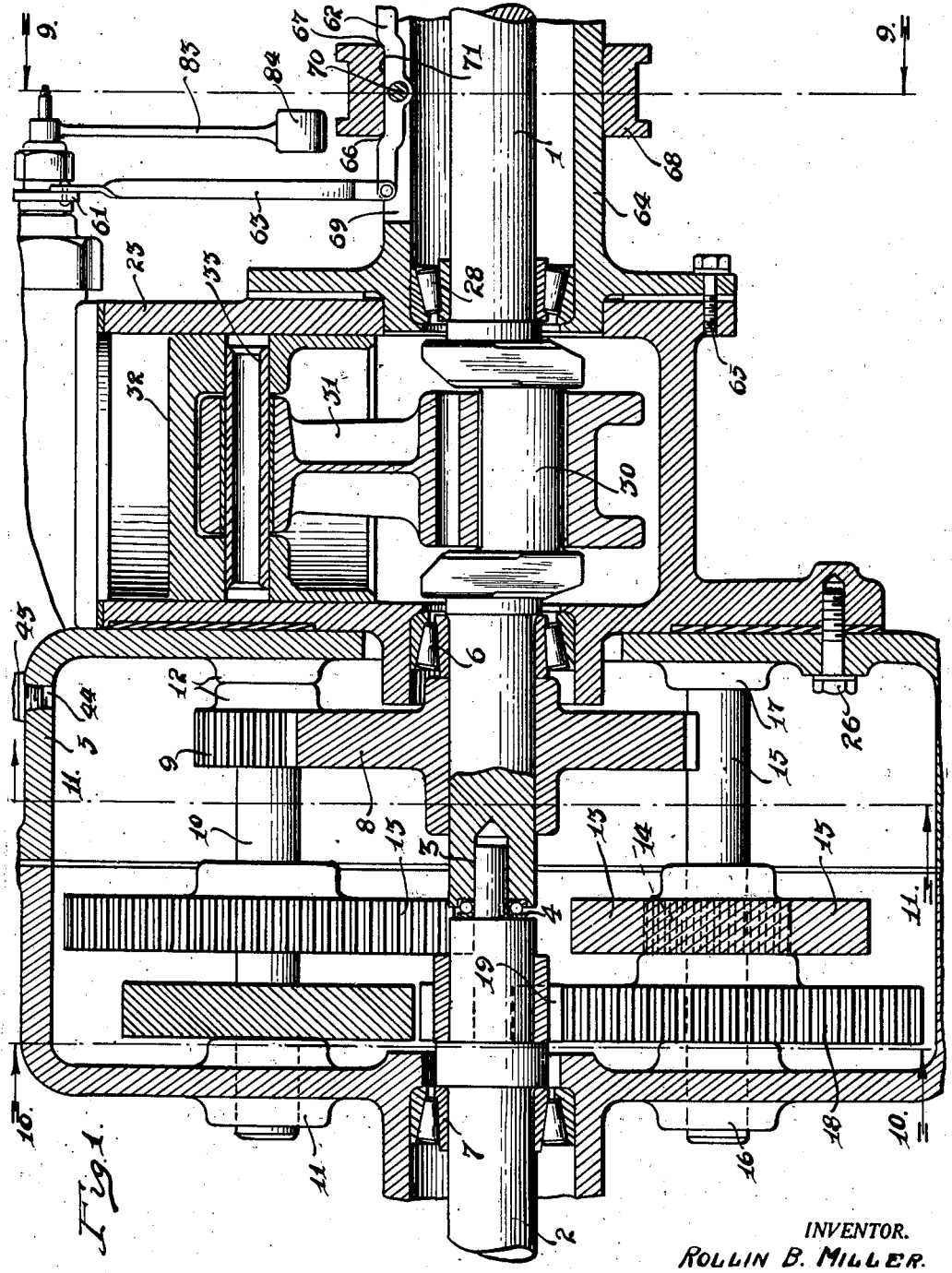
INVENTOR.
ROLLIN B. MILLER.
BY Barnes and Kisselle
ATTORNEY.

Aug. 25, 1931.    R. B. MILLER    1,820,083
HYDRAULIC VARIABLE SPEED POWER TRANSMITTING MECHANISM
Filed Aug. 25, 1930    4 Sheets-Sheet 2
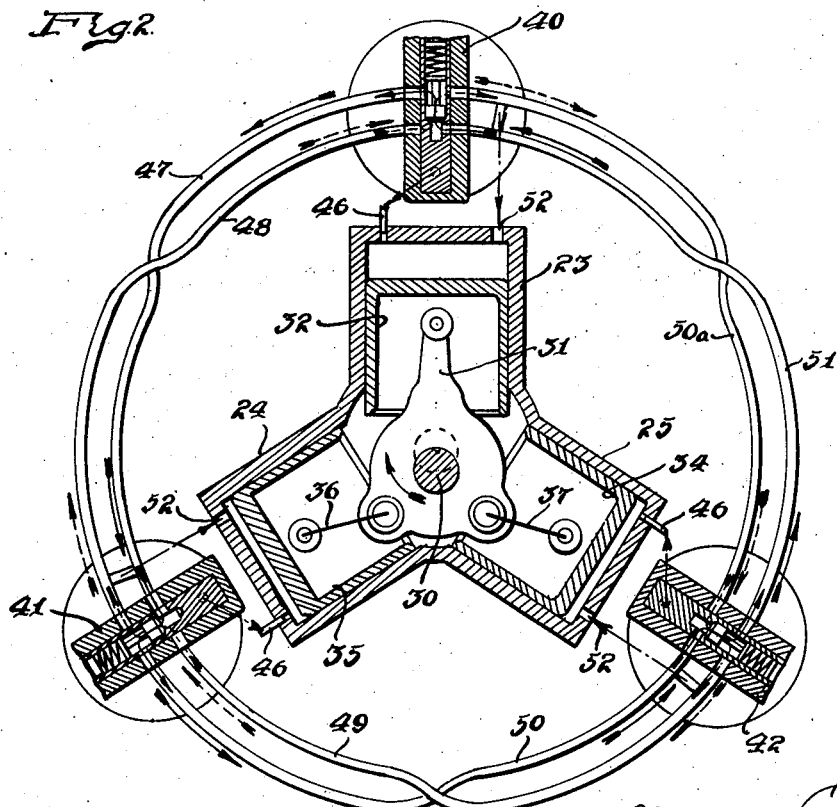
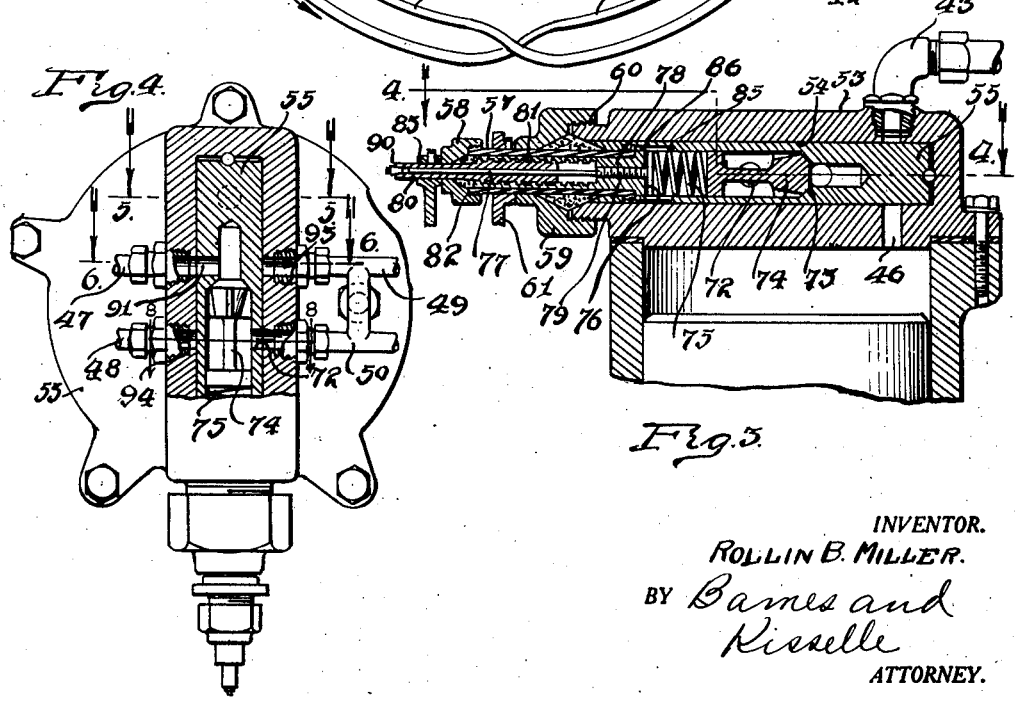
INVENTOR.
ROLLIN B. MILLER.
BY Barnes and
Kisselle
ATTORNEY.

Aug. 25, 1931.                R. B. MILLER                 1,820,083
            HYDRAULIC VARIABLE SPEED POWER TRANSMITTING MECHANISM
                        Filed Aug. 25, 1930         4 Sheets-Sheet 3
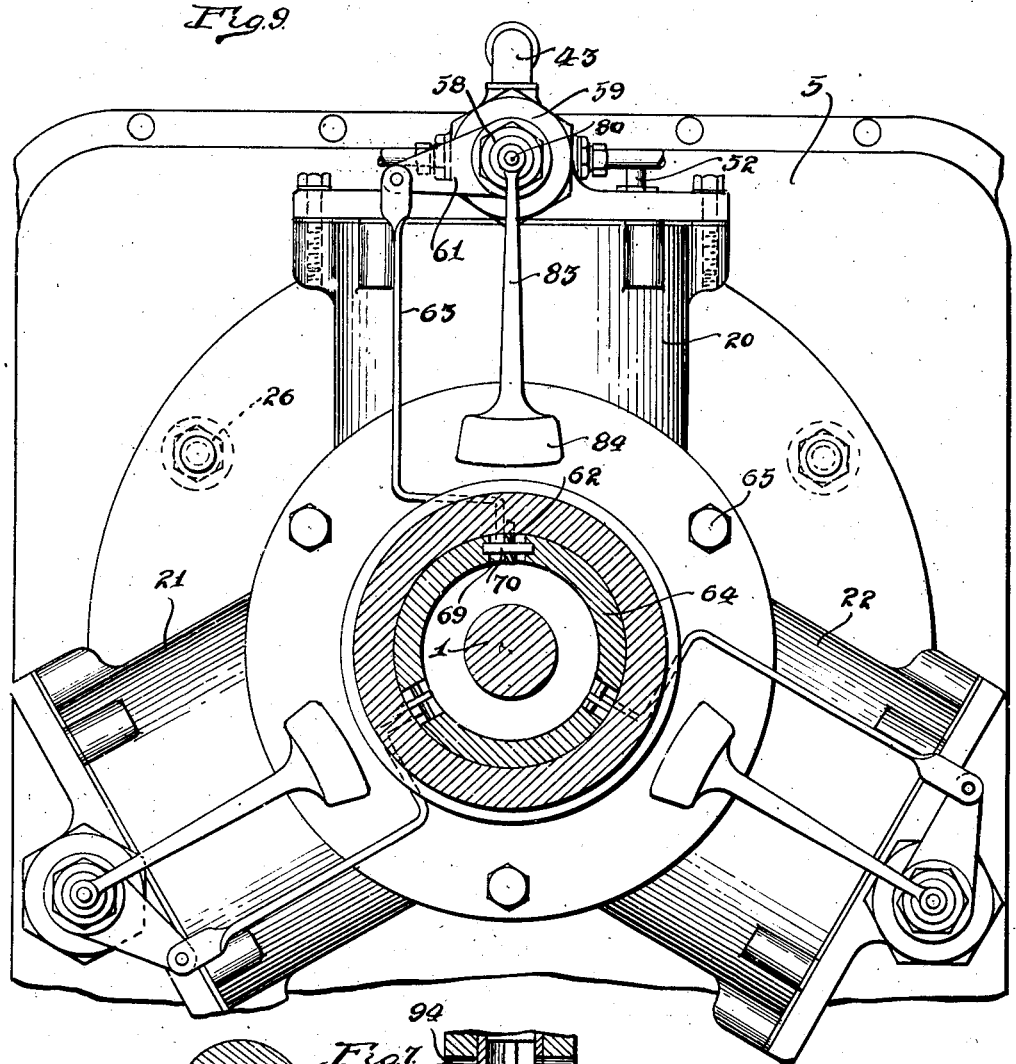
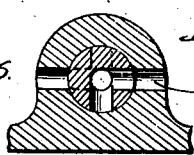
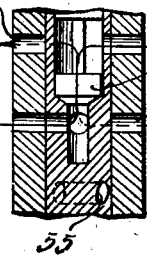
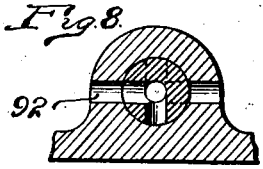
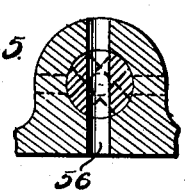
INVENTOR.
ROLLIN B. MILLER.
BY Barnes and
Kisselle
ATTORNEY.

Aug. 25, 1931.　　　　R. B. MILLER　　　　1,820,083
HYDRAULIC VARIABLE SPEED POWER TRANSMITTING MECHANISM
Filed Aug. 25, 1930　　　4 Sheets-Sheet 4

INVENTOR.
ROLLIN B. MILLER.
BY Barnes and Kisselle
ATTORNEY.

Patented Aug. 25, 1931

1,820,083

UNITED STATES PATENT OFFICE

ROLLIN B. MILLER, OF TOLEDO, OHIO

HYDRAULIC VARIABLE SPEED POWER TRANSMITTING MECHANISM

Application filed August 25, 1930. Serial No. 477,556.

This invention relates to a hydraulic variable speed power transmitting mechanism.

It is an object of this invention to produce a variable speed power transmission for an automotive vehicle of such a nature that it will eliminate the necessity for a clutch and all gear shifting. It is appreciated that hydraulic transmissions are not broadly new but the various improvements and objects of the invention herein described will appear as the description progresses.

In the drawings:

Fig. 1 is a horizontal section through the hydraulic transmissions showing the gear casing and the enclosed gears, and the oil pumps.

Fig. 2 is a vertical section through the oil pumps.

Fig. 3 is a detail sectional view of one of the control valves.

Fig. 4 is a view along the line 4—4 of Fig. 3.

Figs. 5 and 6 are detail sections along the lines 5—5 and 6—6 respectively of Fig. 4.

Fig. 7 is a section along the line 4—4 of Fig. 3 with the valve in a different position.

Fig. 8 is a section along the line 8—8 of Fig. 4.

Fig. 9 is a view along the line 9—9 of Fig. 1.

Figure 10:
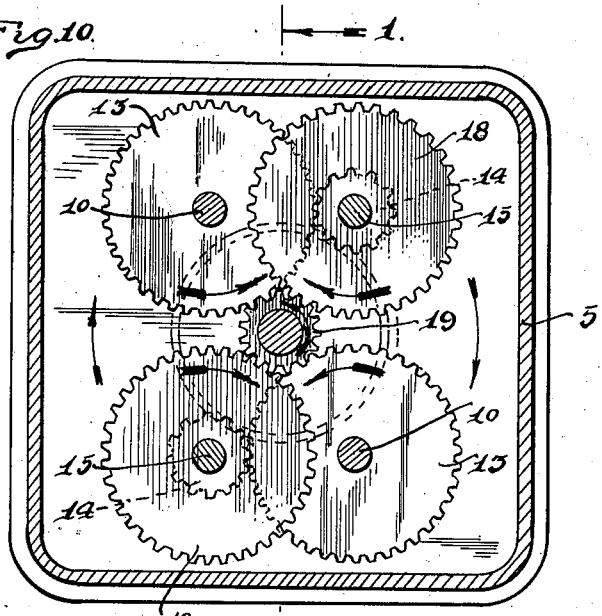
Figure 11:
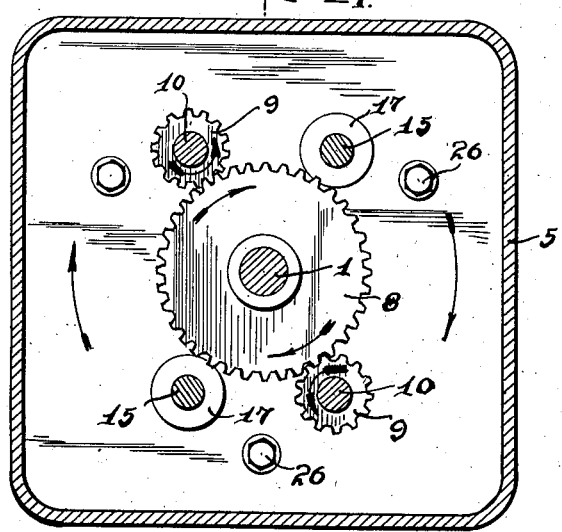

Figs. 10 and 11 are views along the lines 10—10 and 11—11 of Fig. 1 respectively showing the gear arrangement.

Referring more particularly to the drawings the driving shaft may be referenced 1. This driving shaft is connected directly to the flywheel (not shown) of the engine in any well-known manner. The driven shaft may be referenced 2. The driven shaft 2 is journaled into the driving shaft as at 3 and a suitable thrust bearing race 4 may be positioned between the ends of the driving and driven shaft.

In place of the usual transmission it is proposed to transmit the driving torque from the driving member 1 to the driving member 2 through a gear casing 5 containing a specific gear arrangement which will be described below. Since it is proposed to have the gear casing 5 always rotate in the same direction as the driving shaft 1, the gear casing 5 is rotatably mounted upon the driving and driven members in any suitable manner such as through the roller bearing races 6 and 7 respectively.

Since this invention proposes to vary the relative speeds of the driven member and the gear casing 5 by means of a hydraulic pump arrangement, it is essential that the reciprocation of the pump pistons be as slow as is feasible in order to prevent the heating of the oil in the pump cylinders and the consequent inefficient operation of the pumps. To this end I have provided the gear casing 5 with a plurality of gears with such a gear ratio that when the driven member 2 is stationary and the driving member 1 is rotating that the driving member 1 will rotate 45 revolutions to 44 revolutions of the gear casing. To achieve this I have provided the gear casing with the primary driving gear 8 which is fixed to the end of the driving member 1. The primary driving gear 8 meshes with the small secondary gears 9 which are fixed to the shaft 10 which is journaled into the casing at each end as at 11 and 12 respectively. The small secondary gears 9 drive the shafts 10 which in turn rotate the large secondary gears 13 which are also fixed to the shafts 10. The large secondary gears 13 mesh with the small tertiary driving gears 14 which are carried on the shafts 15. The shafts 15 are journaled into the gear casing 5 as at 16 and 17. Spaced from the small gears 14 and fixed to the shaft 15 are the tertiary large driving gears 18. The tertiary driving gears 18 in turn mesh with the small driven gear 19 which is fixed onto the driven member 2. The large gears 8, 13, and 18 are of the same size and the same is true of the small gears 9, 14, and 19. The circumference of the large gear is three and one-half times that of the smaller gear. This gear ratio and gear arrangement is necessary to achieve the result desired, namely, that the casing 5 should rotate 44 times to every 45 rotations of the driving shaft when the driven shaft 2 is stationary.

Since the speed of the automotive vehicle is controlled by varying the relative speeds of the casing driving shaft 1, a suitable means must be provided to vary this ratio between the speeds of the gear casing 5 and the driving member 1. To this end, a set of three radially positioned pumps generally referenced 20, 21, and 22 are provided. The cylinders of these pumps may be referenced 23, 24, and 25 respectively. These cylinders are fixed directly to the gear casing 5 by any suitable means such as the bolts 26. Hence, the pumps rotate with the gear casing 5. The pump cylinders are rotatably mounted on the driving shaft 1 by means of a suitable roller bearing race 28 in a manner similar to that of the gear casing 5. The driving shaft 1 is provided with a suitable crank throw 30 which has rotatably mounted thereupon the master connecting rod 31 which is pivoted to the piston 32 in the cylinder 23 by means of the connecting pin 33. The master connecting rod in turn is connected to the pistons 34 and 35 respectively by the pivoted links 36 and 37.

When the pistons are free to reciprocate in the pump cylinders and the driven shaft is stationary, then by virtue of the gear mechanism in the gear casing 5, the gear casing 5 makes 44 revolutions to every 45 of the driving shaft 1. By increasing the revolutions of the gear casing 5 above 44, causing a closer ratio between the housing and the drive shaft, the driven shaft 2 is caused to rotate so as to cause a forward movement of the vehicle. When the gear casing attains 45 revolutions to every 45 of the driving shaft, then the driving shaft is driving the driven shaft directly. When the revolutions of the casing 5 fall below 44 to every 45 of the driving member or a wider ratio is affected between the two, then a reverse movement of the driven shaft is produced.

This variation in the number of revolutions in the casing is achieved by impeding the freedom of reciprocation of the pump pistons 32, 34, and 35 in the pump cylinders 23, 24, and 25. To this end a suitable impedance valve is provided for each cylinder and as the impedance of the reciprocation of each piston is increased, obviously the speed of the gear casing 5 relative to the driving shaft 1, is increased. To this end cylinders 23, 24, and 25 are provided with identical valves 40, 41, and 42. Each cylinder is connected directly to the casing 5 by means of an oil line 43 opening into the gear casing 5 as at 44 and into the cylinders as at 46. The gear casing is arranged to be partially filled with oil or other fluid of sufficient depth that it will cover the outlet opening 44 and yet at the same time not reach the journal of the driving and driven shafts in the gear casing. The feed lines 43 are arranged to be connected with, and cut off from the outlet 44 by means of the valves 40, 41, and 42 as will be explained below. The valves 40 and 41 are connected by the crossed feed lines 47 and 48, the valves 41 and 42 by the crossed feed lines 49 and 50, and the valves 40 and 42 by the crossed feed lines 50a and 51. The valves 40, 41, and 42 have a single feed line connection 52 each with the cylinders 23, 24, and 25. Since each of the valves 40, 41, and 42 are the same, the description will be limited to but one valve.

The valve consists of the outer casing 53 having a cylindrical opening 54 in which is rotatably mounted the inner cylinder valve 55. The cylinder valve 55 is provided with a port 56 whose sole function is to connect the cylinder oil outlets 46 with the feed line 43. When the port 56 so connects the cylinder outlets 46 with the oil line 43 which runs to the gear casing 5 the pump pistons merely pump the oil into the gear casing 5 and then back again. In other words, other than for the friction of the oil with the oil line, no resistance is offered the reciprocation of the pistons and in such a case the gear casing 5 makes substantially 44 revolutions to each 45 revolutions of the driving member providing the driven shaft 2 is stationary.

The cylinder valve 55 has threaded thereto the bushing 57 which is threaded into the gland 58. The bushing 57 is rotatably mounted in the packing gland 59 which is threaded onto the valve casing 53 as at 60. The bushing 57 has keyed thereto the arm 61. The arm 61 is connected to the pivoted lever 62 by means of the link 63. The driving shaft housing 64, which is fixed to the pump cylinders by means of the bolt 65, is provided with a suitable opening 69 in which is pivotally mounted a lever 62 as at 70. The lever 62 has a depression 71 therein which is flush with the outer surface of the housing 64 with the two opposed cam surfaces 66 and 67 extending upwardly from the outer surface of the housing 64. A suitable collar 68 is slidably mounted on the driving shaft housing 64 and engages the pivoted lever 62 in the said depression. Hence, the collar 68 can be moved forwardly or backwardly against either the cam surface 66 or 67 to pivot the lever 62 to in turn rotate the lever 61 through the link 63. The rotation of the lever 61 which is fixed to the bushing 57 which in turn is threaded into the cylinder valve 55 causes the valve 55 to be rotated so that the ports thereof are aligned in which ever manner is desired as will be explained below.

The cylinder 55 in turn has an opening 72, the bottom 73 of which provides a seat for the valve 74. The valve 74 is yieldably retained against the valve seat 73 by the coil spring 75. The coil spring 75 is backed up by a plate 76 which is fixed to a stem 77 which is threaded into a bushing 78 as at 79. The stem 77 projects through a bushing 80 as at 90, the bushing 80 being rotatably mounted in the gland 58. The bushing 80 has a threaded engagement within the bushing 78 as at 81. The bushing 78 is slidably mounted within the bushing 57 whereas the bushing 57 has a shouldered abutment 82 with the gland 58. The bushing 80 has keyed thereto the lever 83 which has the weight 84 at the end thereof. The bushing 55 has the short internal groove 85 arranged to slidably receive the projecting lugs 86 of the bushing 78 which causes the bushing 78 to slidably, but not rotatably, engage the bushing 57. It will be noted that the plate 76 abuts against the inner end of the bushing 78. This arrangement permits the tension of the spring 75 to be increased in two ways. Firstly, the stem 77 can be turned as at 90 and owing to the threaded engagement as at 79 with the bushing 78 the plate 76 is moved forwardly or backwardly to increase or decrease the tension of the coil spring 75. The plate 76 is rotatably mounted on the end of the stem 77. Secondly, the centrifugal weighted levers 83 may be centrifugally operated to turn the bushing 80 which has a shouldered engagement with the gland 58 as at 82 and hence by means of the threads 81, screws the internally threaded bushing 78 either forwardly or backwardly to increase or decrease the tension on the coil spring 75. Owing to the arrangement of the spring pressed valve 74 which seats against the valve seat 73, the oil from the oil lines can only flow through the valves in one direction. As shown in Fig. 4, the oil is free to pass from the oil line 47 through the port 91 where it pushes back the valve 74, thence passes into the opening 72, and then through the port 92 into the oil line 50.

If the valve 55 is turned through 90° then as shown in Fig. 7, the oil will flow from oil line 49 through the port 93, thence past the valve 74 through the port 94 into the feed line 48. In other words, by the use of this type of valve the oil can be passed through one set of oil lines in one direction and another set of oil lines in the opposite direction being impeded in its flow by the valve 74, the tension of which may be regulated as above described. The cylinders 23, 24, and 25 and the pistons are so regulated that when one is compressing the other will be taking in oil. Hence, there is no chance for the oil to be compressed enough to cause breakage of the oil lines.

Referring to Fig. 2 and assuming that the crank shaft turns in the direction of the arrow then pump 24 is nearing the completion of its compression stroke, pump 25 is on its intake stroke, and pump 23 is just commencing its compression stroke. At this time, as shown by the dotted arrows, the oil from the cylinder 24 is being forced out of the port 52 into the oil line 48 where it passes through the valve 40 and into the line 50a and thence into cylinder 25 which is on the suction stroke. The oil from pump 24 could not pass through oil line 47 into the pump cylinder 23 because of the check valve 74 in the valve 40. Hence, it must travel in a direction toward pump 25. As pump 23 compresses, the oil passes through the port 52 into the oil line 50a in a clockwise direction because of the valve 40 it passes through the valve 42 and thence into oil line 49, and then through port 52 into the pump 24 which is now starting on its suction stroke. In a similar manner when pump 25 starts on its compression stroke it forces the oil out of the port 52 through the oil line 49, valve 41, oil line 48, the valve 40, and thence into the cylinder 23. The point is that so long as the valves 40, 41, and 42 have their ports in the position shown in Fig. 4 the oil will flow in a clockwise direction. The only resistance to this flow of oil is the friction of the oil with the oil lines and the impedance afforded by the check valves 74 which are backed up by the coil spring 75. Hence, as the tension on the coil spring 75 is increased either by the centrifugal lever 83 or by turning the threaded stem 77 the pistons in the oil pumps obviously have to work harder and move less easily within the cylinders, consequently increasing the speed of the gear casing 5 relative to the driving shaft 1. In other words, as the flow of oil from one pump to the other is increasingly impeded by increasing the tension on the spring 75 the gear casing 5 revolves at an increasing rate of 44 revolutions to each 45 of the crank shaft and tends to approach 45 revolutions to each 45 of the crank shaft at which time the driving torque will be direct from the drive shaft to the driven shaft. To effect reverse movement the valves 40, 41, and 42 are turned by use of the collar 67 and associated pivot means 62 so that the valve 55 assumes the position shown in Fig. 7. Hence, as the pumps function the oil flows in a manner similar to that as above described only in a counter-clockwise direction as shown by arrows in full lines. For instance, on the compression stroke of pump 24 the oil flows from port 52 through valve 41 into the feed line 50, thence into pump 25 which is on the suction stroke. When pump 23 starts on its compression stroke it forces the oil through its outlet port 52 and valve 40 into the feed line 47 into the pump 24 which is on its suction stroke. In a similar manner the oil passes from pump 25 as it compresses, through valve 42, the oil line 51, into pump 23 which will be on the suction stroke. The point being that the oil flows in a counter-clockwise direction or reverse to that of the crank shaft. When it is desired to place the transmission in neutral the valves are positioned so that the valve 55 has the port 56 in alignment with the outlet port 46 (Fig. 3) of each pump and hence connects each pump directly with the line 43 which runs to the port 44 in the gear casing 5. In this position the pumps merely pump the oil to and from the gear casing 5 with practically no impedance and hence do not speed up or slow down the revolutions of the gear casing 5 which continues to rotate 44 times to each 45 of the crank shaft 1.

When power is applied to drive shaft 1, pressure is brought to bear against spring 75 by means of centrifugal levers 83 as mentioned before. The pressure on valve 74 is the amount of resistance offered by the pull. If the pressure is greater than the resistance offered by the spring, the valve will open causing a wide ratio between the drive shaft 1 and driven shaft 2, and as the spring pressure gradually overcomes the resistance offered, a closer ratio between the two shafts takes place. Should the power be applied to the driven shaft when the valves are set for a forward motion, for instance, reaching the top of an incline and starting the descent, the pistons would immediately reverse their action, that is, pressure on pistons would immediately become suction, and as the gearing is so arranged that the housing will start to revolve in the same direction faster than the driven shaft 2, the strain on the valves and pistons causes the motor to speed up as if the gears were in second or first position as in a present day transmission.

Although the gear casing has been described as rotating 44 revolutions to each 45 of the driving shaft when the driven shaft is stationary, it is understood that this ratio of revolutions between the gear casing and the driving shaft, when the driven shaft is stationary, can be varied; the point being that in order to prevent the heating of the oil it is highly desirable to have the pistons reciprocate in the cylinders as slowly as is commensurable with an efficient working of the device. It is found that with this ratio the pistons reciprocate once every 44 revolutions of the gear casing but it is understood that by altering the gear ratio in the gear box that this rate of reciprocation of the pistons may be either raised or lowered to any desirable degree to obtain an efficient working of the device without heating the oil.

Claims:

1. In a hydraulic variable speed power transmitting mechanism the combination of a driving shaft and a driven shaft each having a gear fixed thereto, a gear casing rotatably mounted on the said shafts, a plurality of gears rotatably mounted in the said gear casing of such a ratio that when the one shaft remains stationary the gear casing will rotate in the same direction effecting a close ratio with the other shaft, at least three fluid pumps rotatably mounted on the said driving shaft and fixed to the gear casing, pistons for the said pumps each having a connecting rod operatively connected to a crank throw on the driving shaft, fluid pipe lines connecting the said pump cylinders whereby the fluid of the one cylinder may flow into the other, and valve means for variably impeding the flow of the fluid from one pump to another whereby the ratio between the gear casing and the driving shaft may be varied to in turn vary the rate of rotation of the said driven member.

2. In a hydraulic variable speed power transmitting mechanism the combination of a driving shaft and a driven shaft each having a gear fixed thereto, a gear casing rotatably mounted on the said shafts, a plurality of gears rotatably mounted in the said gear casing of such a ratio that when the one shaft remains stationary the gear casing will rotate in the same direction effecting a close ratio with the other shaft, at least three fluid pumps rotatably mounted on the said driving shaft and fixed to the gear casing, pistons for the said pump each having a connecting rod operatively connected to a crank throw on the driving shaft, fluid pipe lines connecting the said pump cylinders whereby the fluid of the one cylinder may flow into the other, and valve means controlling the flow of oil from one pump to another, and centrifugally operated means varying the resistance of the said valves to the flow of oil from one pump to another whereby the speed of the driven shaft may be controlled.

3. In a hydraulic variable speed power transmitting mechanism the combination of a driving shaft and a driven shaft each having a gear fixed thereto, a gear casing rotatably mounted on the said shafts, a plurality of gears rotatably mounted in the said gear casing of such a ratio that when the one shaft remains stationary the gear casing will rotate in the same direction effecting a close ratio with the other shaft, at least three fluid pumps rotatably mounted on the said driving shaft and fixed to the gear casing, pistons for the said pump each having a connecting rod operatively connected to a crank throw on the driving shaft, a pair of fluid pipe lines connecting the said pumps, a valve for controlling the flow of fluid into and from each of the said pumps whereby the flow of oil may be in a direction reverse to the direction of rotation of the said driving shaft and gear casing to in turn vary the ratio between the driving shaft and the gear casing.

4. In a hydraulic variable speed power transmitting mechanism the combination of a driving member and a driven member, means rotatably mounted on the said driving and driven members and arranged to rotate always in the direction of the driving member for conducting the driving torque to the driven member, and hydraulic means including a plurality of pumps, inter-connecting feed lines, and valves for controlling the flow of fluid through the feed lines, each of said valves including an outer casing having a plurality of ports therein connected with the feed lines, an inner rotatable member having a plurality of ports, and a spring pressed valve therein whereby when some of the ports of the outer member are aligned with some of the ports of the inner member the fluid will flow therethrough opening the spring pressed valve against the tension of the said spring whereby the rate of rotation of the gear casing relative to the driving member will be varied.

5. A valve for a hydraulic variable speed power transmitting mechanism comprising in combination of an outer casing having a plurality of ports arranged to be connected with fluid lines, an inner rotatable member having a plurality of ports, a spring pressed valve within the inner rotatable member for resisting the flow of fluid therethrough, and means for varying the tension of the said spring whereby when some of the ports of the inner rotatable member are aligned with some of the ports of the outer member the resistance to the flow of fluid therethrough and past the spring pressed valve may be varied by varying the tension on the said spring.

6. In a hydraulic variable speed power transmitting mechanism the combination of a driving shaft and a driven shaft, a gear fixed to the driving shaft, a gear fixed to the driven shaft, a gear casing rotatably mounted on the driving and driven shafts and having a plurality of gears rotatably mounted therein arranged to intermesh with the gears on the driving and driven shafts, hydraulic means arranged to rotate with the said gear casing including a plurality of pumps with inter-connecting fluid lines and a valve, said valve comprising an outer casing having a plurality of ports arranged to be connected with fluid lines, an inner rotatable member having a plurality of ports, a spring pressed valve within the inner rotatable member for resisting the flow of fluid therethrough, and centrifugally operated means for varying the tension of the said spring whereby when some of the ports of the inner rotatable member are aligned with some of the ports of the outer member the resistance of the flow of fluid therethrough and past the spring pressed valve may be varied by varying the tension on the said spring to in turn vary the ratio between the driving shaft and gear casing.

In testimony whereof I affix my signature.

ROLLIN B. MILLER.